United States Patent
Mathews et al.

(10) Patent No.: US 12,452,268 B2
(45) Date of Patent: *Oct. 21, 2025

(54) METHODS, SYSTEMS, AND MEDIA FOR DETECTING ANOMALOUS NETWORK ACTIVITY

(71) Applicant: McAfee, LLC, San Jose, CA (US)

(72) Inventors: Sherin M. Mathews, Santa Clara, CA (US); Vaisakh Shaj, Kollam (IN); Sriranga Seetharamaiah, Bangalore (IN); Carl D. Woodward, Santa Clara, CA (US); Kantheti V V S M B Kumar, Bangalore (IN)

(73) Assignee: McAfee, LLC, San Jose, CA (US)

(*) Notice: Subject to any disclaimer, the term of this patent is extended or adjusted under 35 U.S.C. 154(b) by 670 days.

This patent is subject to a terminal disclaimer.

(21) Appl. No.: 17/223,912

(22) Filed: Apr. 6, 2021

(65) Prior Publication Data

US 2021/0226975 A1 Jul. 22, 2021

Related U.S. Application Data

(63) Continuation of application No. 16/138,553, filed on Sep. 21, 2018, now Pat. No. 11,005,868.

(51) Int. Cl.
*H04L 9/40* (2022.01)
*G06N 3/02* (2006.01)
(Continued)

(52) U.S. Cl.
CPC .......... *H04L 63/1425* (2013.01); *G06N 3/02* (2013.01); *G06N 20/00* (2019.01); *H04L 41/142* (2013.01);
(Continued)

(58) Field of Classification Search
CPC . H04L 63/14; H04L 63/1425; H04L 63/1433; H04L 63/1441; H04L 41/0893;
(Continued)

(56) References Cited

U.S. PATENT DOCUMENTS 7,363,656 B2   4/2008   Weber et al.
7,610,367 B2 * 10/2009   Canright ................. H04L 41/12
                                                            709/223

(Continued)

FOREIGN PATENT DOCUMENTS

KR           101888683           8/2018

OTHER PUBLICATIONS

International Search Report and Written Opinion dated Jan. 10, 2020 in International Patent Application No. PCT/US2019/051666, pp. 1-10.

(Continued)

*Primary Examiner* — David Garcia Cervetti
(74) *Attorney, Agent, or Firm* — Byrne Poh LLP (57) ABSTRACT

Methods, systems, and media for detecting anomalous network activity are provided. In some embodiments, a method for detecting anomalous network activity is provided, the method comprising: receiving information indicating network activity, wherein the information includes IP addresses corresponding to devices participating in the network activity; generating a graph representing the network activity, wherein each node of the graph indicates an IP address of a device; generating a representation of the graph, wherein the representation of the graph reduces a dimensionality of information indicated in the graph; identifying a plurality of clusters of network activity based on the representation of the graph; determining that at least one cluster corresponds to anomalous network activity; and in response to determining that the at least one cluster corresponds to anomalous (Continued)

network activity, causing a network connection of at least one device included in the at least one cluster to be blocked.

15 Claims, 4 Drawing Sheets

(51) Int. Cl.
| | | |
|---|---|---|
| *G06N 20/00* | (2019.01) | |
| *H04L 41/14* | (2022.01) | |
| *H04L 41/142* | (2022.01) | |
| *H04L 43/045* | (2022.01) | |
| *G06F 16/901* | (2019.01) | |
| *H04L 101/668* | (2022.01) | |

(52) U.S. Cl.
CPC .......... *H04L 41/145* (2013.01); *H04L 43/045* (2013.01); *H04L 63/1441* (2013.01); *G06F 16/9024* (2019.01); *H04L 2101/668* (2022.05)

(58) Field of Classification Search
CPC ... H04L 41/142; H04L 41/145; H04L 43/045; H04L 2101/668; H04L 2463/144; H04L 63/145; H04L 63/1458; G06N 20/00; G06N 3/02; G06N 3/08; G06N 20/10; G06F 16/9024; G06F 21/566
See application file for complete search history.

(56) References Cited

U.S. PATENT DOCUMENTS

| | | | | |
|---|---|---|---|---|
| 8,625,860 | B2 * | 1/2014 | Kveton | G06V 40/16 |
| | | | | 382/164 |
| 8,656,161 | B2 * | 2/2014 | Nakae | H04L 61/457 |
| | | | | 713/168 |
| 8,762,298 | B1 * | 6/2014 | Ranjan | G06F 21/552 |
| | | | | 706/12 |
| 8,792,298 | B2 | 7/2014 | Toennessen | |
| 10,476,896 | B2 * | 11/2019 | DiValentin | G06F 16/254 |
| 11,146,578 | B2 * | 10/2021 | Lem | G06N 5/022 |
| 11,982,871 | B2 * | 5/2024 | Chamberlin | G02B 7/36 |
| 2007/0209074 | A1 * | 9/2007 | Coffman | G06F 21/552 |
| | | | | 709/224 |
| 2009/0070870 | A1 | 3/2009 | Riordan | |
| 2010/0057895 | A1 | 3/2010 | Huang | |
| 2015/0020199 | A1 * | 1/2015 | Neil | H04L 63/1408 |
| | | | | 726/23 |
| 2016/0014147 | A1 * | 1/2016 | Zoldi | H04L 61/4511 |
| | | | | 726/23 |
| 2016/0219066 | A1 * | 7/2016 | Vasseur | H04L 63/1458 |
| 2016/0352768 | A1 * | 12/2016 | Lefebvre | H04L 43/04 |
| 2017/0149812 | A1 | 5/2017 | Alton et al. | |
| 2018/0013777 | A1 * | 1/2018 | DiValentin | G06Q 10/0635 |
| 2018/0077180 | A1 | 3/2018 | Zhang et al. | |
| 2018/0097828 | A1 * | 4/2018 | Coskun | H04W 12/08 |
| 2018/0255084 | A1 * | 9/2018 | Kotinas | H04L 63/1425 |
| 2019/0132224 | A1 * | 5/2019 | Verma | G06F 18/24 |
| 2019/0166144 | A1 * | 5/2019 | Mirsky | G06N 20/20 |
| 2019/0327252 | A1 * | 10/2019 | Grothendieck | H04L 63/1425 |
| 2021/0092140 | A1 * | 3/2021 | Kazerounian | G06N 3/08 |
| 2022/0400130 | A1 * | 12/2022 | Kapoor | H04L 63/10 |
| 2025/0106233 | A1 * | 3/2025 | Bishop, III | G06F 18/2321 |

OTHER PUBLICATIONS

Liffreing, I., "How Brands are Using Apple's New AR Capabilities", In Digday, Sep. 25, 2017, pp. 1-5.
Notice of Allowance dated Feb. 3, 2021 in U.S. Appl. No. 16/138,553, pp. 2-4.
Office Action dated Jul. 15, 2020 in U.S. Appl. No. 16/138,553, pp. 2-8.
Extended European Search Report dated May 13, 2022 in EP Patent Application No. 19862623.6, pp. 1-8.
International Patent Application No. PCT/US2019/051666, filed Sep. 18, 2019, pp. 1-27.
International Preliminary Report on Patentability dated Apr. 1, 2021 in International Patent Application No. PCT/US2019/051666, pp. 1-7.
U.S. Appl. No. 16/138,553, filed Sep. 21, 2018, pp. 1-13.

* cited by examiner

METHODS, SYSTEMS, AND MEDIA FOR DETECTING ANOMALOUS NETWORK ACTIVITY

CROSS REFERENCE TO RELATED APPLICATION

This application is a continuation of U.S. patent application Ser. No. 16/138,553, filed Sep. 21, 2018, which is hereby incorporated by reference herein in its entirety.

TECHNICAL FIELD

The disclosed subject matter relates to methods, systems, and media for detecting anomalous network activity.

BACKGROUND

With an increase of network-connected devices and an increasing reliance on cloud computing services, there is a corresponding increase of network security issues. For example, network-connected devices can be involved in different types of malicious activity, such as a Denial of Service (DoS) attack, a Distributed Denial of Service (DDoS) attack, propagation of a virus or worm, etc. However, it can be difficult to quickly detect new malicious activity. For example, a volume of network activity can be large enough that it can be difficult to quickly analyze the network activity to identify anomalous behaviors or patterns of devices participating in the network activity.

Accordingly, it is desirable to provide new methods, systems, and media for detecting anomalous network activity.

SUMMARY

Methods, systems, and media for detecting anomalous network activity are provided. In accordance with some embodiments of the disclosed subject matter, a method for detecting anomalous network activity is provided, the method comprising: receiving information indicating network activity on a network, wherein the information includes a plurality of IP addresses corresponding to a plurality of devices participating in the network activity and information relating to packets transmitted between devices included in the plurality of devices participating in the network activity; generating a mathematical model that is a graph representing the network activity, wherein each node of the graph indicates an IP address of a device participating in the network activity; generating a representation of the graph representing the network activity, wherein the representation of the graph representing the network activity reduces a dimensionality of information indicated in the graph representing the network activity; identifying a plurality of clusters of network activity based on the representation of the graph representing the network activity; determining that at least one cluster of the plurality of clusters corresponds to anomalous network activity; and in response to determining that the at least one cluster of the plurality of clusters corresponds to anomalous network activity, causing a network connection of at least one device included in the at least one cluster to be blocked.

In accordance with some embodiments of the disclosed subject matter, a system for detecting anomalous network activity is provided, the system comprising: a memory; and a hardware processor coupled to the memory that is configured to: receive information indicating network activity on a network, wherein the information includes a plurality of IP addresses corresponding to a plurality of devices participating in the network activity and information relating to packets transmitted between devices included in the plurality of devices participating in the network activity; generate a mathematical model that is a graph representing the network activity, wherein each node of the graph indicates an IP address of a device participating in the network activity; generate a representation of the graph representing the network activity, wherein the representation of the graph representing the network activity reduces a dimensionality of information indicated in the graph representing the network activity; identify a plurality of clusters of network activity based on the representation of the graph representing the network activity; determine that at least one cluster of the plurality of clusters corresponds to anomalous network activity; and in response to determining that the at least one cluster of the plurality of clusters corresponds to anomalous network activity, cause a network connection of at least one device included in the at least one cluster to be blocked.

In accordance with some embodiments of the disclosed subject matter, a non-transitory computer-readable medium containing computer-executable instructions that, when executed by a processor, cause the processor to perform a method for detecting anomalous network activity is provided, the method comprising: receiving information indicating network activity on a network, wherein the information includes a plurality of IP addresses corresponding to a plurality of devices participating in the network activity and information relating to packets transmitted between devices included in the plurality of devices participating in the network activity; generating a mathematical model that is a graph representing the network activity, wherein each node of the graph indicates an IP address of a device participating in the network activity; generating a representation of the graph representing the network activity, wherein the representation of the graph representing the network activity reduces a dimensionality of information indicated in the graph representing the network activity; identifying a plurality of clusters of network activity based on the representation of the graph representing the network activity; determining that at least one cluster of the plurality of clusters corresponds to anomalous network activity; and in response to determining that the at least one cluster of the plurality of clusters corresponds to anomalous network activity, causing a network connection of at least one device included in the at least one cluster to be blocked.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for detecting anomalous network activity are provided.

In some embodiments, the mechanisms described herein can detect anomalous network activity by analyzing graphs of network activity. For example, in some embodiments, the mechanisms can receive information indicating network activity, such as source IP addresses and destination IP addresses of devices participating in network activity, source and destination ports of network activity, information relating to packets transmitted between devices (e.g., a number of bytes included in a particular transmitted packet, and/or any other suitable information), and/or any other suitable information indicating network activity. In some embodiments, the mechanisms can construct a graph representing the network activity. For example, in some embodiments, a graph representing network activity can have multiple nodes, with each node representing an IP address of a device participating in the network activity. As another example, in some embodiments, a graph can be a weighted graph, where weights associated with each edge between two nodes (e.g., each connection between two IP addresses) can include any suitable information, such as a number of connections between the two nodes, an average number of bytes per packet transmitted between the two nodes, a number of ports scanned, and/or any other suitable information. Note that, in some embodiments, IP address information and/or port information can be encrypted.

In some embodiments, the mechanisms described herein can analyze a graph of network activity in any suitable manner. For example, in some embodiments, the mechanisms can reduce high-dimensional information included in a graph of network activity to a lower-dimensional space that can be visualized, thereby creating a representation of the graph of network activity. As a more particular example, in some embodiments, the mechanisms can reduce information included in a graph of network activity to two or three dimensions that can be visualized in any suitable manner, such as a scatter plot. In some embodiments, the mechanisms can use any suitable dimensionality reduction technique or combination of techniques, such as t-Stochastic Neighbor Embedding (t-SNE), and/or any other suitable technique(s).

In some embodiments, the mechanisms can detect anomalous activity based on a representation of a graph of network activity. For example, in some embodiments, the mechanisms can identify clusters of network activity based on a representation of a graph of network activity using a trained machine learning classifier, and/or in any other suitable manner. In some embodiments, the mechanisms can then identify a cluster of network activity corresponding to anomalous network activity. For example, in some embodiments, the anomalous network activity can correspond to a particular type of malicious attack, such as a Denial of Service (DoS) attack, a Distributed Denial of Service (DDoS) attack, propagation of a virus or malware, a Ping attack, a Hostsweep attack, a Portscan attack, and/or any other suitable type of malicious attack.

In some embodiments, the mechanisms can perform any suitable action(s) in response to detecting anomalous activity or malicious activity. For example, in some embodiments, the mechanisms can identify source IP addresses of devices propagating malicious activity and can cause the source IP addresses to be blocked from accessing a network corresponding to analyzed network activity. As another example, in some embodiments, the mechanisms can transmit a notification to an administrator of a network indicating detected anomalous activity that is to be further investigated.

Note that, in some embodiments, analyzed network activity can correspond to any suitable time window, such as five seconds, ten seconds, thirty seconds, and/or any other suitable time window. In some such embodiments, the mechanisms described herein can continuously update and/or analyze updated time windows of network activity, thereby allowing anomalous activity to be quickly detected on a particular network.

In some embodiments, the mechanisms described herein can be used to improve computer security. For example, by analyzing graphs of network activity, anomalous network activity by particular devices participating in a network can be identified without requiring particular types of information, such as signatures of different types of malicious activity, packet payload information, etc. Additionally, in some embodiments, relationships between different devices can be ascertained even if IP address information or port information is encrypted. Furthermore, by analyzing network activity over relatively short time windows, anomalous activity can be quickly detected, thereby allowing a malicious attack to be quickly slowed or stopped.

Figure 1:
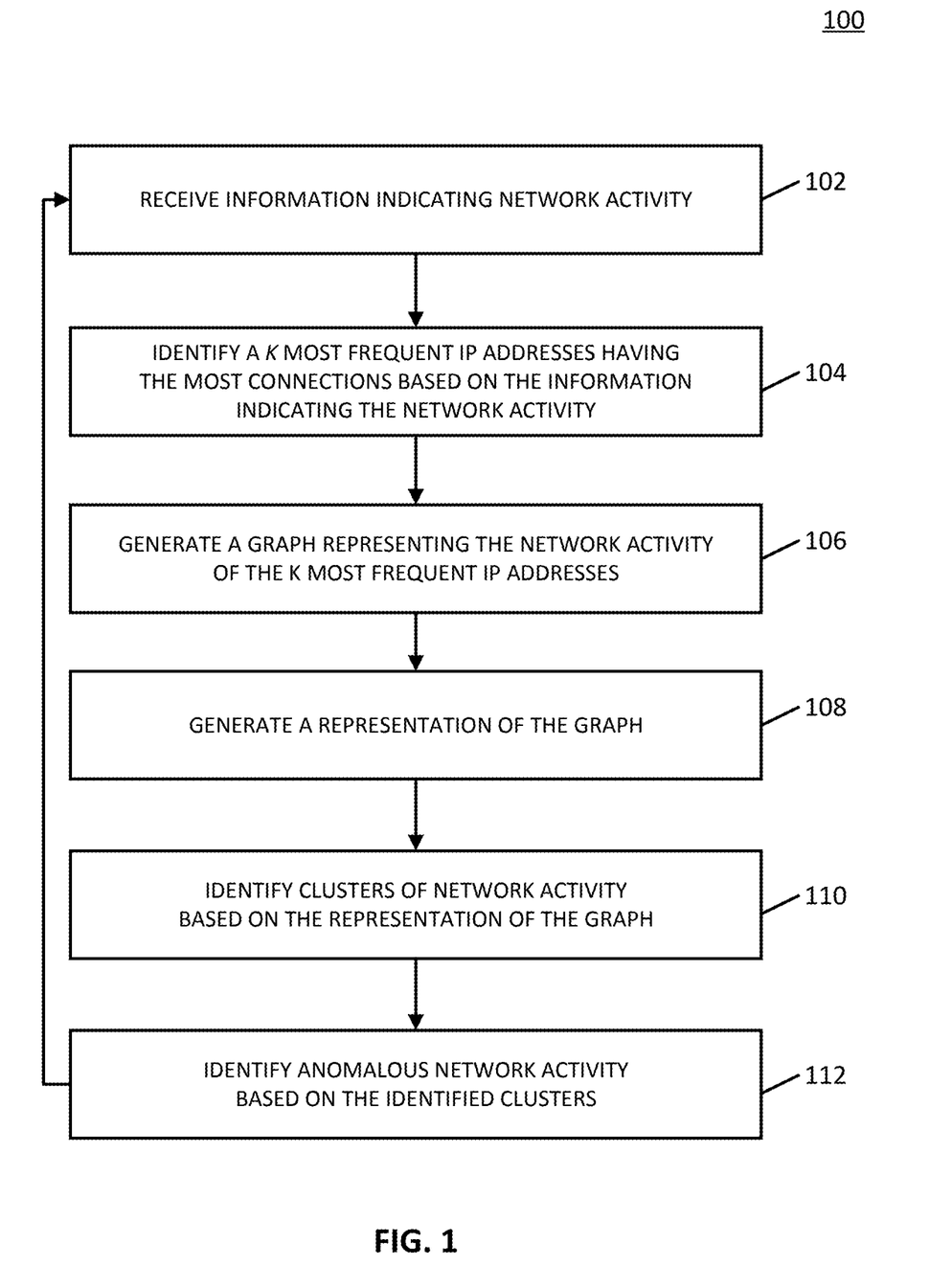
FIG. 1 shows an example of a process for detecting anomalous network activity in accordance with some embodiments of the disclosed subject matter.

Turning to FIG. 1, an example 100 of a process for detecting anomalous network activity is shown in accordance with some embodiments of the disclosed subject matter. In some embodiments, blocks of process 100 can be executed by any suitable device, such as a server associated with a security service, and/or any other suitable device.

Process 100 can begin by receiving information indicating network activity at 102. In some embodiments, the network activity can include any suitable type of activity, such as activity of individual user devices accessing a cloud service, activity of devices connected to other devices to transmit or receive information, and/or any other suitable type of network activity. In some embodiments, the information indicating network activity can include any suitable type of information, such as source IP addresses of devices that initiate an activity, destination IP addresses of devices that receive a communication from another device, information about packets exchanged through a network (e.g., a number of bytes included in a particular packet, and/or any other suitable information), source port information, destination port information, and/or any other suitable information. Note that, in some embodiments, any suitable information, such as IP addresses, ports, and/or any other suitable information, can be encrypted in any suitable manner.

In some embodiments, process 100 can receive the information indicating network activity from any suitable source. For example, in instances where the network activity is associated with activity related to a particular cloud service, the information can be received from the cloud service. As a more particular example, in some embodiments, the information can include log information collected by the cloud service. Note that, in some embodiments, the received information can span any suitable time period (e.g., five seconds, ten seconds, thirty seconds, one minute, five minutes, and/or any other suitable time period).

At 104, process 100 can identify a K most frequent IP addresses having the most connections based on the information indicating the network activity. In some embodiments, K can be any suitable number (e.g., ten, one hundred, one thousand, and/or any other suitable number). In some embodiments, the identified IP addresses can be source IP addresses, destination IP addresses, and/or any suitable combination. For example, in some embodiments, the identified IP addresses can include source IP addresses that initiate connections to any suitable number of destination IP addresses. As another example, in some embodiments, the identified IP addresses can include destination IP addresses that receive connections from any suitable number of source IP addresses. In some embodiments, process 100 can identify the K most frequent IP addresses in any suitable manner. For example, in some embodiments, process 100 can utilize any efficient sorting algorithm to identify the K IP addresses have highest number of connections among all IP addresses in the current time window.

At 106, process 100 can generate a graph representing the network activity of the K most frequent IP addresses. In some embodiments, the graph can be any suitable type of mathematical model representing a graph and can indicate any suitable information. For example, in some embodiments, each node of the graph can indicate an IP address. As another example, in some embodiments, the graph can be a directed weighted graph. As a more particular example, in some embodiments, the graph can be a directed weighted graph that indicates, for each connection between two nodes, whether each node is a source IP address or a destination IP address. As another more particular example, in some embodiments, the graph can be a directed weighted graph where the weights indicate any suitable information, such as a number of connections between two nodes (N), an average number of bytes per packet sent between two nodes (B), a number of ports scanned (P), and/or any other suitable information. As a specific example, in some embodiments, weights of the directed weighted graph can be a three-component vector that, for each edge of the graph connecting two nodes, indicates [N, B, P].

Figure 2A:
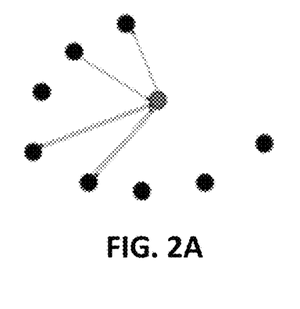
FIGS. 2A-2C show examples of graphs of network activity in accordance with some embodiments of the disclosed subject matter.
Figure 2B:
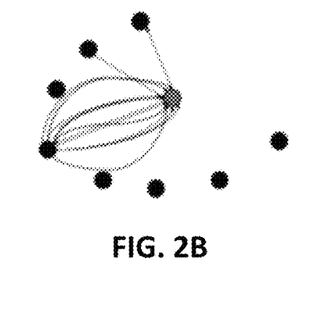
Figure 2C:
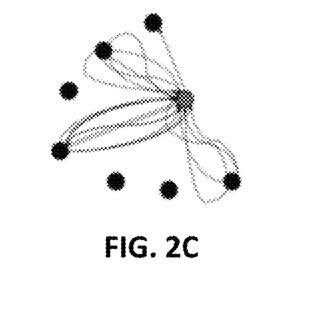

Turning to FIGS. 2A-2C, examples of graphs are shown in accordance with some embodiments of the disclosed subject matter. Referring to FIG. 2A, an example of normal network activity is shown in accordance with some embodiments of the disclosed subject matter. Referring to FIG. 2B, an example of network activity indicating a DoS attack is shown in accordance with some embodiments of the disclosed subject matter. Referring to FIG. 2C, an example of network activity indicating a DDoS attack is shown in accordance with some embodiments of the disclosed subject matter. Note that, in FIGS. 2A-2C, weights of corresponding edges are not directly indicated.

Referring back to FIG. 1, at 108, process 100 can generate a representation of the graph. In some embodiments, the representation of the graph can be stored or represented in any suitable type of data structure, such as a vector, a matrix, and/or any other suitable type of data structure. For example, in some embodiments, process 100 can represent the graph as three adjacency matrices of network activity indicated by [N, B, P] between source IP addresses and destination IP addresses (e.g., where a first dimension of the matrix represents source IP addresses and a second dimension of the matrix represents destination IP addresses, and/or any other suitable matrix). As a more particular example, in some embodiments, elements of a first matrix can indicate number of connections between a source IP address and a destination IP address, elements of a second matrix can indicate average number of bytes per packet sent between a source IP address and a destination IP address, and elements of a third matrix can indicate number of ports scanned between a source IP address and a destination IP address. For example, in some embodiments, the representation of the graph can reduce high-dimensional data indicated in the graph to a two-dimensional or three-dimensional representation that can be visualized programmatically. In some embodiments, process 100 can generate the representation of the graph in any suitable manner and using any suitable technique(s). For example, in some embodiments, process 100 can generate the representation of the graph using a t-Stochastic Neighbor Embedding (t-SNE) technique.

Figure 3:
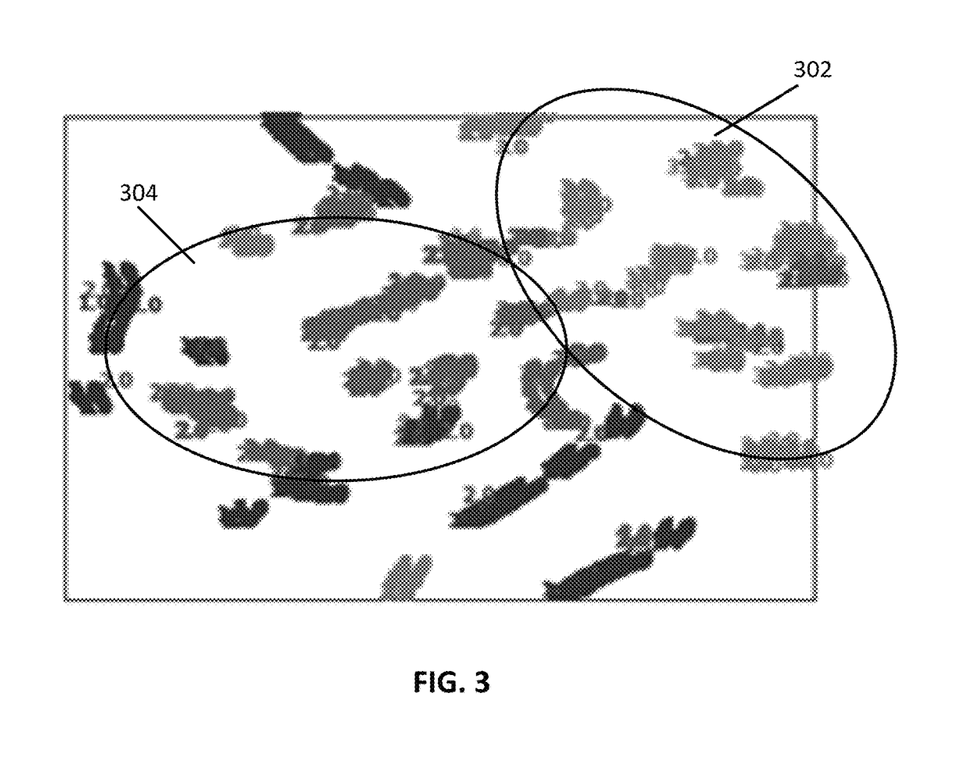
FIG. 3 shows an example of a representation of a graph of network activity in accordance with some embodiments of the disclosed subject matter.

Turning to FIG. 3, an example of a representation of the graph generated using a t-SNE technique is shown in accordance with some embodiments of the disclosed subject matter. In some embodiments, the representation of the graph can place points within the representation that are similar to each other in any suitable aspects. For example, points within the representation can represent source IP addresses that have all initiated connections to a particular destination IP address, IP addresses that have transmitted packets with a particular range of average bytes per packet, and/or similar in any other suitable aspect.

Note that, in some embodiments, the representation of the graph can be generated using any other suitable type of technique or combination of techniques for reducing high-dimensional data to a lower-dimensional space, such as self-organizing maps, Principal Component Analysis (PCA), localized PCA, kernel PCA, Independent component analysis, singular-value decomposition (SVD), manifold learning and/or any other suitable technique(s).

Referring back to FIG. 1, at 110, process 100 can identify clusters of network activity based on the representation of the graph. Examples of clusters include cluster 302 and cluster 304 as shown in FIG. 3. In some embodiments, each cluster can represent any suitable type of network activity, such as normal network activity, a DoS attack, a DDoS attack, and/or any other suitable type of network activity. Note that, referring to FIG. 3, points included in FIG. 3 are labeled (e.g., "1.0," "2.0," and/or "3.0"), indicating a cluster each point has been assigned to.

In some embodiments, process 100 can identify the clusters of network activity using any suitable technique or combination of techniques. For example, in some embodiments, process 100 can use the representation of the graph (e.g., a result of the t-SNE analysis of the graph of the network activity, and/or any other suitable data) as an input to a machine learning classifier or other algorithm that identifies clusters. In some embodiments, any suitable type of classifier can be used to identify clusters within the representation of the graph, such as a Support Vector Machine (SVM), a logistic regression, a neural network, and/or any other suitable type of classifier.

Note that, in instances where a machine learning classifier is used, the classifier can be trained using any suitable training data, such as representations of graphs where network activity has been manually identified or tagged as particular types of network activity (e.g., normal network activity, activity included in a DoS attack, activity included in a DDoS attack, activity included in a Hostsweep attack, activity included in a Ping attack, activity included in a Portscan attack, and/or any other suitable type of network activity). In some embodiments, any suitable number of training samples (e.g., one thousand, ten thousand, one million, and/or any other suitable number) of training samples can be used.

At 112, process 100 can identify anomalous network activity based on the identified clusters. In some embodiments, process 100 can identify any suitable type of anomalous network activity, such as a DoS attack, a DDoS attack, a Portscan attack, a Ping attack, a Hostsweep attack, and/or any other suitable type of anomalous network activity. In some embodiments, the anomalous activity can be identified based on the clusters identified as described above in connection with 110. For example, in some embodiments, process 100 can determine that a cluster of activity in a particular region of the representation of the graph (e.g., cluster 302 and/or cluster 304 as shown in and described above in connection with FIG. 3) corresponds to a particular type of network activity, such as a DoS attack, and/or any other suitable type of network activity.

Note that, in some embodiments, process 100 can additionally identify devices and/or IP addresses involved in the identified anomalous activity based on points included in a cluster corresponding to identified anomalous activity. For example, in some embodiments, process 100 can identify all IP addresses belonging to a cluster (e.g., all points in a particular cluster, such as cluster 302 and/or cluster 304) as nodes involved in identified anomalous activity. As a more particular example, process 100 can determine whether particular nodes in a cluster corresponding to identified anomalous activity correspond to source IP addresses and/or destination IP addresses. As a specific example, in some embodiments, in an instance where the anomalous activity is a DDoS attack, process 100 can determine whether nodes included in the cluster corresponding to the DDoS attack are source IP addresses (e.g., IP addresses participating in the DDoS attack) or destination IP addresses (e.g., IP addresses targeted in the DDoS attack).

In some embodiments, process 100 can perform any suitable action(s) in response to identifying the anomalous network activity. For example, in some embodiments, process 100 can block devices associated with IP addresses determined to be participating in malicious activity and/or determined to be likely to be participating in malicious activity. As a more particular example, continuing with the example above in which process 100 identifies IP addresses of devices participating in a DDoS attack (e.g., source IP addresses of devices involved in a DDoS attack), process 100 can block the devices from accessing a network, thereby allowing the DDoS attack to be slowed or stopped. As another example, in some embodiments, process 100 can notify an administrator associated with the network corresponding to the network activity. As a more particular example, in some embodiments, process 100 can transmit a notification or a message to a device associated with the administrator indicating that potential malicious activity has been detected, as well as any other relevant information, such as IP addresses of devices likely to be participating in malicious activity, IP addresses likely to be a target of malicious activity, and/or any other suitable information.

In some embodiments, process 100 can loop back to 102 and receive additional information indicating network activity. For example, in some embodiments, process 100 can receive information indicating updated network activity corresponding to an updated time window. In some such embodiments, by continuously analyzing network activity, process 100 can detect, in real-time and/or in near real-time, anomalous network activity indicative of a malicious attack.

Figure 4:
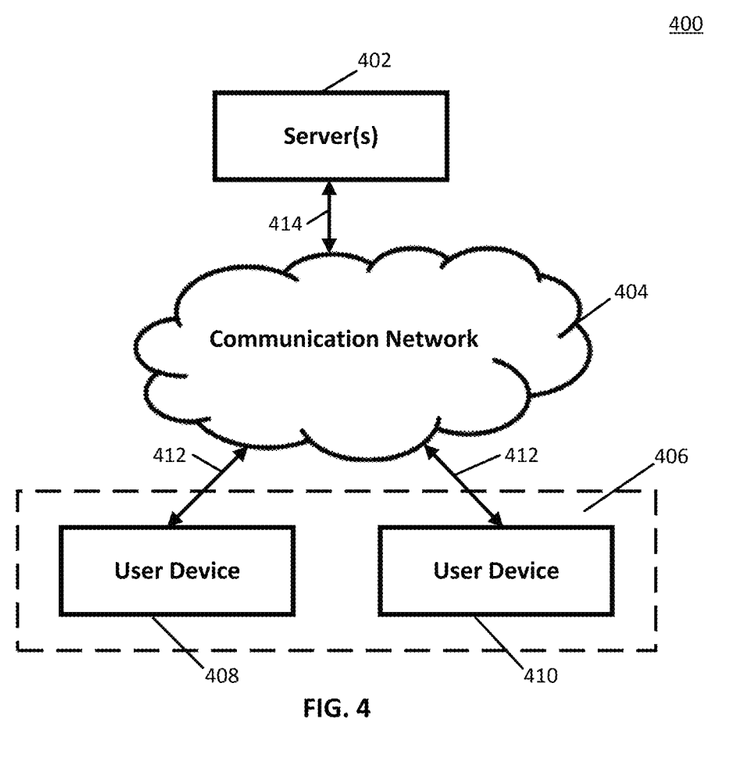
FIG. 4 shows a schematic diagram of an illustrative system suitable for implementation of mechanisms described herein for detecting anomalous network activity in accordance with some embodiments of the disclosed subject matter.

Turning to FIG. 4, an example 400 of hardware for detecting anomalous network activity that can be used in accordance with some embodiments of the disclosed subject matter is shown. As illustrated, hardware 400 can include one or more servers 402, a communication network 404, and/or one or more user devices 406, such as user devices 408 and 410.

Server(s) 402 can be any suitable server(s) for storing information, data, programs, and/or any other suitable type of content for detecting anomalous network activity. For example, in some embodiments, server(s) 402 can receive logs indicating network activity (e.g., source IP addresses and corresponding destination IP addresses, information about packets transmitted between a source IP address and a destination IP address, and/or any other suitable network activity information), and can identify anomalous network activity in any suitable manner based on the received logs. As a more particular example, in some embodiments, server(s) 402 can generate a graph representing the network activity and can identify anomalous activity based on the graph, as described above in more detail in connection with FIG. 1. Note that, in some embodiments, server(s) 402 can be associated with any suitable entity, such as an entity that provides any suitable network security services, and/or any other suitable entity.

Communication network 404 can be any suitable combination of one or more wired and/or wireless networks in some embodiments. For example, communication network 404 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. In some embodiments, user devices 406 can be connected by one or more communications links (e.g., communications link 412) to communication network 404. In some embodiments, communication network 404 can be linked via one or more communications links (e.g., communications link 414) to server(s) 402. The communications links can be any communications links suitable for communicating data among user devices 406 and server(s) 402, such as network links, dial-up links, wireless links, hard-wired links, any other suitable communications links, or any suitable combination of such links.

User devices 406 can include any one or more user devices. For example, in some embodiments, user devices 406 can include user devices, such as a mobile phone, a tablet computer, a wearable computer, a laptop computer, a desktop computer, and/or any other suitable user devices. As another example, in some embodiments, user devices 406 can include any suitable IoT devices such as smart appliances (e.g., smart thermostats, smart kitchen appliances, and/or any other suitable type of smart appliances), smart media devices (e.g., speakers, televisions, and/or any other suitable type of media playback devices), and/or any other suitable type of IoT devices.

Although server(s) 402 is illustrated as one device, the functions performed by server(s) 402 can be performed using any suitable number of devices in some embodiments. For example, in some embodiments, multiple devices can be used to implement the functions performed by server(s) 402.

Although two user devices 406 are shown in FIG. 4 to avoid over-complicating the figure, any suitable number of user devices, and/or any suitable types of user devices, can be used in some embodiments.

Server(s) 402 and user devices 406 can be implemented using any suitable hardware in some embodiments. For example, in some embodiments, devices 402 and 406 can be implemented using any suitable general-purpose computer or special-purpose computer. For example, a user device such as a mobile phone can be implemented as a special-purpose computer. Any such general-purpose computer or special-purpose computer can include any suitable hardware. For example, as illustrated in example hardware 500 of FIG. 5, such hardware can include hardware processor 502, memory and/or storage 504, an input device controller 506, an input device 508, display/audio drivers 510, display and audio output circuitry 512, communication interface(s) 514, an antenna 516, and a bus 518.

Figure 5:
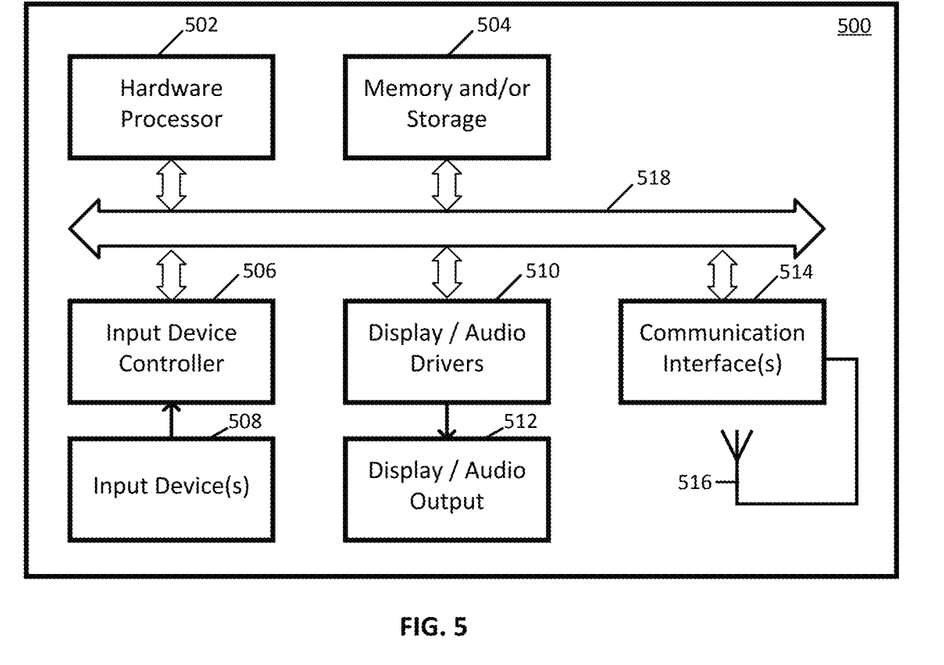
FIG. 5 shows a detailed example of hardware that can be used in a server and/or a user device of FIG. 4 in accordance with some embodiments of the disclosed subject matter.

Hardware processor 502 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 502 can be controlled by a server program stored in memory and/or storage of a server, such as server 402. For example, in some embodiments, the server program can cause hardware processor 502 to detect malicious activity on a network based on a graph of a network activity as described above in connection with FIG. 1, and/or perform any other suitable functions.

Memory and/or storage 504 can be any suitable memory and/or storage for storing programs, data, and/or any other suitable information in some embodiments. For example, memory and/or storage 504 can include random access memory, read-only memory, flash memory, hard disk storage, optical media, and/or any other suitable memory.

Input device controller 506 can be any suitable circuitry for controlling and receiving input from one or more input devices 508 in some embodiments. For example, input device controller 506 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 510 can be any suitable circuitry for controlling and driving output to one or more display/audio output devices 512 in some embodiments. For example, display/audio drivers 510 can be circuitry for driving a touchscreen, a flat-panel display, a cathode ray tube display, a projector, a speaker or speakers, and/or any other suitable display and/or presentation devices.

Communication interface(s) 514 can be any suitable circuitry for interfacing with one or more communication networks (e.g., computer network 404). For example, interface(s) 514 can include network interface card circuitry, wireless communication circuitry, and/or any other suitable type of communication network circuitry.

Antenna 516 can be any suitable one or more antennas for wirelessly communicating with a communication network (e.g., communication network 404) in some embodiments. In some embodiments, antenna 516 can be omitted.

Bus 518 can be any suitable mechanism for communicating between two or more components 502, 504, 506, 510, and 514 in some embodiments.

Any other suitable components can be included in hardware 500 in accordance with some embodiments.

In some embodiments, at least some of the above described blocks of the process of FIG. 1 can be executed or performed in any order or sequence not limited to the order and sequence shown in and described in connection with the figure. Also, some of the above blocks of FIG. 1 can be executed or performed substantially simultaneously where appropriate or in parallel to reduce latency and processing times. Additionally or alternatively, some of the above described blocks of the process of FIG. 1 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for detecting anomalous network activity are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for detecting anomalous network activity, comprising:

generating, using a hardware processor, a weighted directed graph representing network activity, wherein the weighted directed graph has a plurality of nodes and has an edge between two of the plurality of nodes, wherein each node of the graph indicates an IP address of a device participating in the network activity, and wherein the edge has at least one weight, wherein the at least one weight includes at least one of: a number of connections between the two of the plurality of nodes, an average number of bytes per packet sent between the two of the plurality of nodes, and a number of ports scanned;

generating a representation of the graph representing the network activity, wherein the representation of the graph representing the network activity reduces a dimensionality of information indicated in the graph representing the network activity, wherein the representation includes a plurality of adjacency matrices, wherein:

a first of the plurality of adjacency matrices represents one of: a number of connections between a source IP address and a destination IP address; an average number of bytes per packet sent between a source IP address and a destination IP address; and a number of ports scanned; and a second of the plurality of adjacency matrices represents another of: the number of connections between a source IP address and a destination IP address; the average number of bytes per packet sent between a source IP address and a destination IP address; and the number of ports scanned;

identifying a plurality of clusters of network activity from the representation of the graph including the plurality of adjacency matrices;

determining that at least one cluster of the plurality of clusters corresponds to anomalous network activity; and in response to determining that the at least one cluster of the plurality of clusters corresponds to anomalous network activity, causing a network connection of at least one device included in the at least one cluster to be blocked.

2. The method of claim 1, wherein the graph representing the network activity is generated using a subset of a plurality of IP addresses, wherein the subset of the plurality of IP addresses corresponds to a group of IP addresses having the most network connections and wherein the subset of the plurality of IP addresses contains fewer than all of the plurality of IP addresses.

3. The method of claim 1, wherein identifying the plurality of clusters of network activity is based on a machine learning classifier.

4. The method of claim 1, wherein identifying the plurality of clusters of network activity is based on a neural network.

5. The method of claim 1, wherein generating the representation of the graph representing the network activity comprises applying a t-Stochastic Neighbor Embedding (t-SNE) technique to the graph representing the network activity.

6. A system for detecting anomalous network activity, the system comprising:

a memory; and a hardware processor coupled to the memory that is configured to:

generate a weighted directed graph representing network activity, wherein the weighted directed graph has a plurality of nodes and has an edge between two of the plurality of nodes, wherein each node of the graph indicates an IP address of a device participating in the network activity, and wherein the edge has at least one weight, wherein the at least one weight includes at least one of: a number of connections between the two of the plurality of nodes, an average number of bytes per packet sent between the two of the plurality of nodes, and a number of ports scanned;

generate a representation of the graph representing the network activity, wherein the representation of the graph representing the network activity reduces a dimensionality of information indicated in the graph representing the network activity, wherein the representation includes a plurality of adjacency matrices, wherein:

a first of the plurality of adjacency matrices represents one of: a number of connections between a source IP address and a destination IP address; an average number of bytes per packet sent between a source IP address and a destination IP address; and a number of ports scanned; and a second of the plurality of adjacency matrices represents another of: the number of connections between a source IP address and a destination IP address; the average number of bytes per packet sent between a source IP address and a destination IP address; and the number of ports scanned;

identify a plurality of clusters of network activity from the representation of the graph including the plurality of adjacency matrices;

determine that at least one cluster of the plurality of clusters corresponds to anomalous network activity; and in response to determining that the at least one cluster of the plurality of clusters corresponds to anomalous network activity, cause a network connection of at least one device included in the at least one cluster to be blocked.

7. The system of claim 6, wherein the graph representing the network activity is generated using a subset of a plurality of IP addresses, wherein the subset of the plurality of IP addresses corresponds to a group of IP addresses having the most network connections and wherein the subset of the plurality of IP addresses contains fewer than all of the plurality of IP addresses.

8. The system of claim 6, wherein identifying the plurality of clusters of network activity is based on a machine learning classifier.

9. The system of claim 6, wherein identifying the plurality of clusters of network activity is based on a neural network.

10. The system of claim 6, wherein generating the representation of the graph representing the network activity comprises applying a t-Stochastic Neighbor Embedding (t-SNE) technique to the graph representing the network activity.

11. A non-transitory computer-readable medium containing computer-executable instructions that, when executed by a processor, cause the processor to perform a method for detecting anomalous network activity, the method comprising:

generating a weighted directed graph representing network activity, wherein the weighted directed graph has a plurality of nodes and has an edge between two of the plurality of nodes, wherein each node of the graph indicates an IP address of a device participating in the network activity, and wherein the edge has at least one weight, wherein the at least one weight includes at least one of: a number of connections between the two of the plurality of nodes, an average number of bytes per packet sent between the two of the plurality of nodes, and a number of ports scanned;

generating a representation of the graph representing the network activity, wherein the representation of the graph representing the network activity reduces a dimensionality of information indicated in the graph representing the network activity, wherein the representation includes a plurality of adjacency matrices, wherein:

a first of the plurality of adjacency matrices represents one of: a number of connections between a source IP address and a destination IP address; an average number of bytes per packet sent between a source IP address and a destination IP address; and a number of ports scanned; and a second of the plurality of adjacency matrices represents another of: the number of connections between a source IP address and a destination IP address; the average number of bytes per packet sent between a source IP address and a destination IP address; and the number of ports scanned;

identifying a plurality of clusters of network activity from the representation of the graph including the plurality of adjacency matrices;

determining that at least one cluster of the plurality of clusters corresponds to anomalous network activity; and in response to determining that the at least one cluster of the plurality of clusters corresponds to anomalous network activity, causing a network connection of at least one device included in the at least one cluster to be blocked.

12. The non-transitory computer-readable medium of claim 11, wherein the graph representing the network activity is generated using a subset of a plurality of IP addresses, wherein the subset of the plurality of IP addresses corresponds to a group of IP addresses having the most network connections and wherein the subset of the plurality of IP addresses contains fewer than all of the plurality of IP addresses.

13. The non-transitory computer-readable medium of claim 11, wherein identifying the plurality of clusters of network activity is based on a machine learning classifier.

14. The non-transitory computer-readable medium of claim 11, wherein identifying the plurality of clusters of network activity is based on a neural network.

15. The non-transitory computer-readable medium of claim 11, wherein generating the representation of the graph representing the network activity comprises applying a t-Stochastic Neighbor Embedding (t-SNE) technique to the graph representing the network activity.

* * * * *